United States Patent

Lawson

[11] Patent Number: 5,083,582
[45] Date of Patent: Jan. 28, 1992

[54] VALVE WITH REMOVABLE INSERT

[75] Inventor: John E. Lawson, Woking, England
[73] Assignee: Cooper Industries, Inc., Houston, Tex.
[21] Appl. No.: 660,389
[22] Filed: Feb. 25, 1991

[30] Foreign Application Priority Data

Mar. 23, 1990 [EP] European Pat. Off. ......... 90303151.6

[51] Int. Cl.⁵ ................................................. F16K 3/00
[52] U.S. Cl. ................................. 137/454.6; 251/197
[58] Field of Search ............... 251/197, 198, 200; 137/454.6

[56] References Cited

U.S. PATENT DOCUMENTS 3,658,087  4/1972  Nelson ............... 137/454.6
3,749,355  7/1973  Paul, Jr. ............ 137/454.6 X

*Primary Examiner*—John C. Fox
*Attorney, Agent, or Firm*—Jackie L. Duke; Nelson A. Blish; Alan R. Thiele

[57] ABSTRACT

A valve arrangement having an insert assembly (11) receivable in a receptacle (10). The insert assembly includes valve elements for controlling fluid flow through the valve. These include a gate (40) and chamber valve seat members (52, 53). The insert is constructed so that it can be removed from and located in the receptacle. When located in the receptacle and in operation the gate is urged against one of the seat members so that a seal is formed between the seat and gate and between the seat and receptacle body. The gate (40) can be an expandable gate.

6 Claims, 2 Drawing Sheets

VALVE WITH REMOVABLE INSERT

BACKGROUND

This invention relates to valve assemblies. It has particular application to valves which are used typically in relatively inaccessible locations, e.g. valves of the type which are used in subsea pipelines.

The components of valves, e.g. gate valves which are used in subsea locations, are subject to wear, corrosion and erosion and hence periodically need replacement. It has been proposed to mount the flow control components of such valves, typically the gates and seats, in an insert which can be removably mounted in a receiver receptacle. The receptacle can be coupled to the flow line which the valve controls. This enables the insert to be removed either by a diver or by a remotely operated vehicle for the replacement of the valve components. In such arrangements it is necessary to provide an adequate seal between the insert and the receiver. Known arrangements use inserts or receivers which are relatively complex to produce.

A type of insert valve is shown in the U.S. patent application Ser. No. 07/555,055, of David Garnham, filed July 19, 1990 and assigned to the same assignee as the present application. This application discloses a removable body portion carrying the flow controlling elements, a receptacle which receives the body and axially movable sealing members. The sealing members have metal seals positioned thereon for engagement with the body when it is inserted into the receptacle. Bifurcated levers are mounted on the sealing members and are contacted by the body upon insertion to urge the metal seals into contact with the face of the removable body portion.

The K. B. Bredtschneider et al. U.S. Pat. No. 3,179,121 discloses a ball valve construction with a ball and seats manually removable as a unit. The seats seal against the valve body with elastomeric seal means on a tapered surface.

The M. R. Jones U.S. Pat. No. 3,589,674 discloses another ball valve structure with a second pressure balancing stem in which the ball, seats and balance stems are manually removable as a unit.

The J. A. Burkhardt et al. U.S. Pat. No. 3,799,191 discloses a gate valve structure with a removable body containing the gate, seats, stem and stem operating means. The removable body is secured to the valve body by a lock ring.

The R. L. Ripert U.S. Pat. No. 4,387,735 discloses a valve structure removable from a pipeline wherein the valve is received within a support structure attached to the pipeline. The support structure has seal rings mounted therein which a worm gear mechanism activates into engagement with the removable valve structure to form a fluid tight conduit.

The R. L. Ripert U.S. Pat. No. 4,431,022 discloses a removable valve structure received within a support structure similar to that of the '735 patent. The valve structure has all components mounted therein, including a sealing means on each end of the valve which is biased outwardly to engage parallel plates on the support structure. A pressure responsive means for moving the seal rings inwardly during installation and removal is also disclosed.

The J. E. Lawson U.S. Pat. No. 4,874,008 discloses a valve mounting structure whereby hydraulic studs are used to secure a valve body between mounting members which are part of a block manifold used in oil and gas production.

SUMMARY

According to the present invention there is provided a valve arrangement comprising an insert assembly removably receivable in a receptacle, the insert assembly including valve elements for controlling fluid flow through a flow path in the insert assembly, the receptacle including a flow path which, when the insert assembly is received in the receptacle, communicates with the flow path in the insert assembly, the insert assembly including a gate and annular seat members disposed in the flow path therethrough, the arrangement being such that in operation when the insert assembly is located in the receptacle, movement of the gate against a seat member causes the seat member to be urged into sealing engagement with the gate and the receptacle body.

Preferably the gate is an expandable type gate and said seat member is urged into said sealing engagement by expanding said gate.

An object of the present invention is to provide a valve arrangement of the insert type which is relatively simple to manufacture.

Another object is to provide an insert type valve which can be easily installed and removed from its mounting receptacle.

A further object is to provide an insert type valve which is particularly adaptable to use in relatively inaccessible locations such as subsea oil and gas wells.

BRIEF DESCRIPTION OF THE DRAWINGS

These and other objects and advantages of the present invention are set forth below and further made clear by reference to the drawings, wherein.

DESCRIPTION OF THE PREFERRED EMBODIMENT

Figure 1:
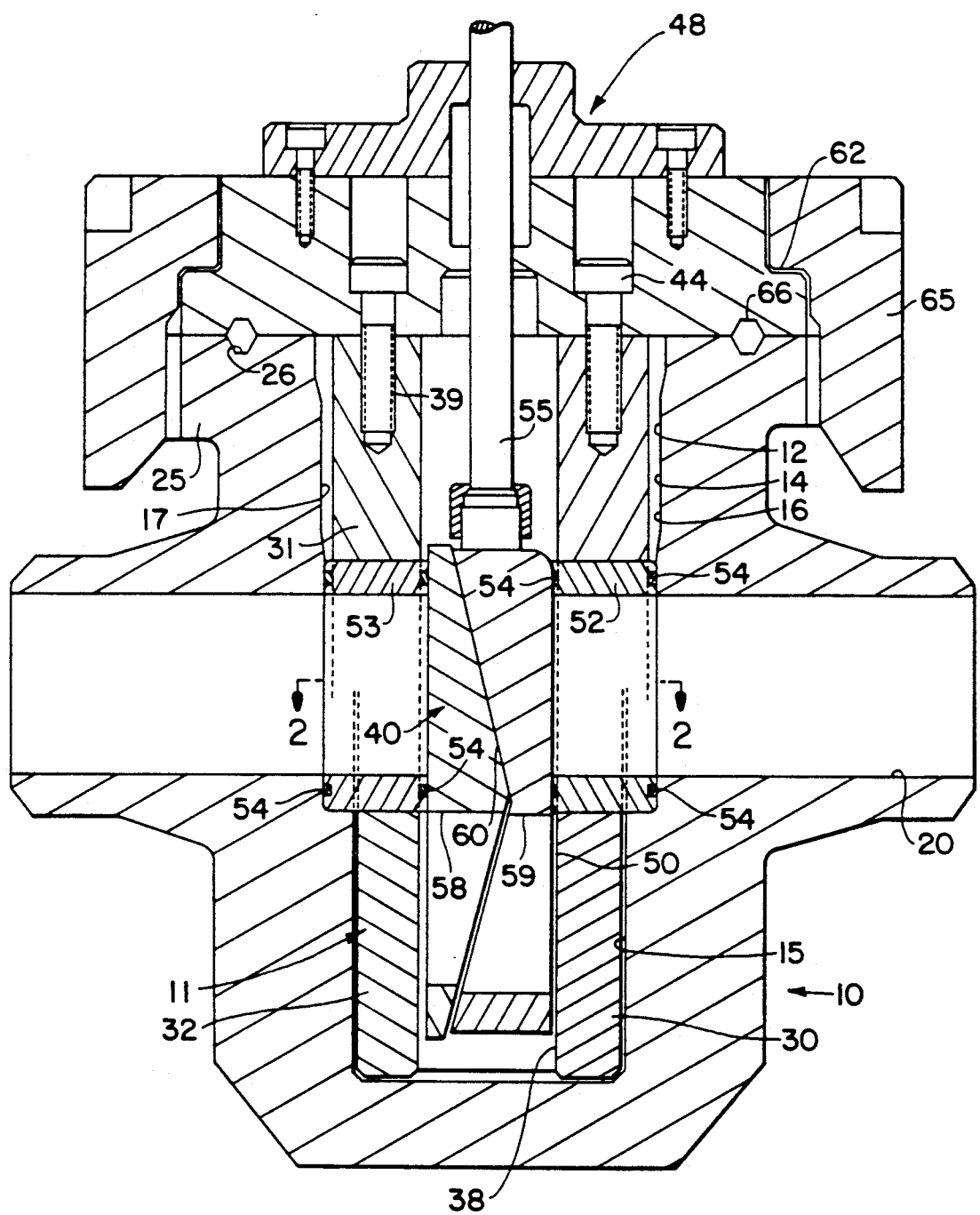
FIG. 1 is an elevation view in section of a valve assembly in accordance with the present invention.

Referring to the drawings a valve assembly comprises a receptacle 10 which can receive a valve insert assembly 11. The receptacle 10 comprises a metallic block formed with a first bore 12 into which the insert 11 is designed to locate. The bore 12 is closed at its lower end. The bore 12 is generally cylindrical and has an upper portion 14 which is slightly wider than the lower portion 15. The wall of the upper bore portion 14 also tapers slightly outwardly towards its upper end. At diametrically opposite positions the wall of the upper bore portion 14 is formed with longitudinally extending recesses 16, 17 which are of generally rectangular cross-section. A second bore 20 extends through the receptacle 10 in a direction generally perpendicular to the axis of the first bore 12. The second bore 20 opens into the lower part of the upper bore portion 14. The recesses 16, 17 are dimensioned such that a flat surface is provided around each opening of the bore 20 at its junction with the bore 12. The longitudinal extent of each recess 16, 17 is from the upper end of the bore 12 to a position just below the bore 20. The second bore 20 constitutes a flow path for fluid such as oil flowing in a subsea flow line. Typically the receptacle 10 will be connected to such a flow line.

The upper part of the receptacle block 10 around the open end of the bore 12 has an outwardly extending annular flange 25. The upper surface of the block inwardly of the flange is formed with an annular groove 26.

Figure 2:
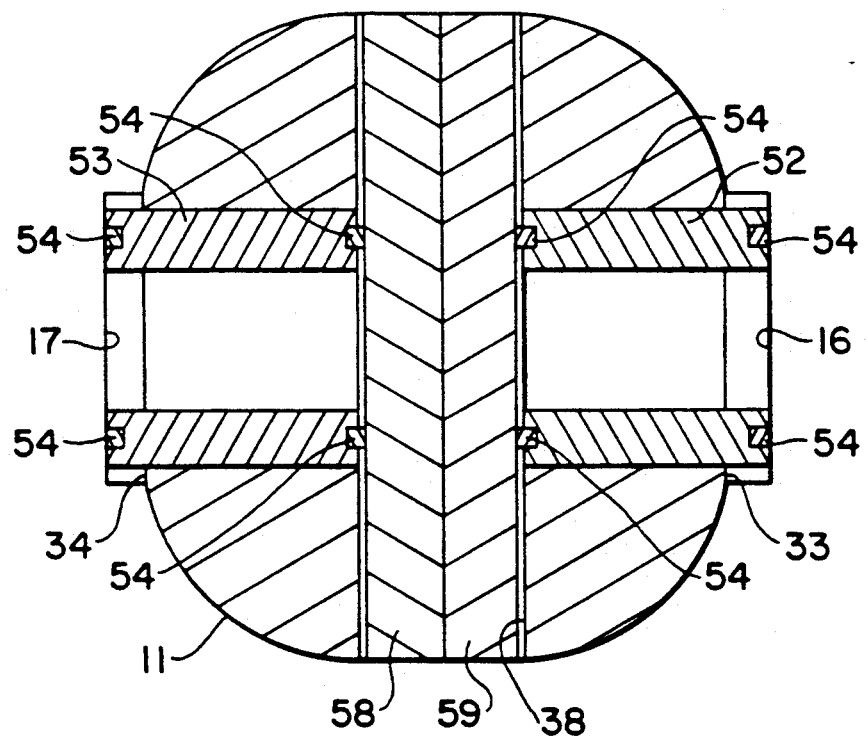
FIG. 2 is an enlarged sectional view on the line 2—2 of FIG. 1.

The insert assembly has a body portion 30 which is generally cylindrical. An upper part 31 of the body 30 has a diameter which is slightly greater than the lower part 32. The lower part 32 is designed to locate in the lower bore portion 15 whilst the upper part locates in the upper bore portion 14. As can be seen in FIG. 2 diametrically opposite segmental portions 33, 34 of the upper body part 31 are cut away, these being located in juxtaposition with the recesses 16 and 17 of the receptacle 10. The body portion 30 is formed with a central through aperture 38 of rectangular cross-section, this aperture being arranged to receive an expanding type gate 40. The upper body part 31 is formed with tapped bores 39 which extend axially into the wall of the body portion 30 from the upper surface thereof. The bores are engaged by bolts 44 which couple the body 30 to a bonnet assembly 48.

The body 30 also has a lateral through bore 50 extending perpendicular to the longitudinal axis of the aperture 38. The bore 50 when the insert is in position in the receptacle is arranged so that it extends coaxially with the bore 20. Two annular seat members 52, 53 are carried by the body 30 at opposite end portions of the bore 50. The annular inner and outer end faces of each seat member carry metal seals 54 which are located in grooves in the seats.

The gate 40 is an expanding type gate which is coupled by an upwardly extending rod 55 which extends through the bonnet 48 to an actuating mechanism (not shown.) The actuating mechanism can be operated to actuate the gate in a known manner. The gate comprises two juxtaposed parts 58, 59 which have matching inner engaging profiles 60, such that when one part is moved axially relative to the other the effective lateral dimension of the gate is varied. The two parts of the gate have a through bore 60 which can be aligned by axial movement of the gate with the bore 20. When the gate 40 is in the position shown in FIG. 1 it prevents flow through the flow line 20. When the gate is raised to bring the bore 60 into alignment with the flow line 20 the valve is open and fluid can flow through the valve.

The bonnet assembly 48 is formed with a shoulder 62 which in the assembled position is engaged by an annular clamping ring 65 which receivably engages the flange 25 to couple the bonnet assembly to the housing 10. The lower face of the bonnet has an annular groove 66 which aligned with the groove 26. A suitable seal is disposed in the aligned grooves.

In operation the valve body 30 is initially connected to the bonnet assembly 48 using the bolts 44. The gate 40 is arranged such that its lateral extent is at a minimum. The bonnet with the body 30 suspended from it is then lowered towards the receptacle 10. The body 30 is aligned such that the diametrically opposed flats on the body are at positions corresponding to those of the recesses 16 and 17 in the receptacle 10. The body 30 is then lowered into the bore 12 formed in the receptacle. As can be seen the outer dimensions of the body 30 are such that there is a small clearance between the body and the wall of the bore 30. Also with the gate in its condition of minimum lateral extent there is a clearance between the outer ends of the seat members 52, 53 and the wall of the bore 12 in the receptacle. When the body has been lowered to a position corresponding to that shown in FIG. 1 the gate is actuated such that its lateral extent is increased. This action places a relatively high load between the gate and the seat members 52, 53 which causes a metal-to-metal seal to be formed both between the gate body and seal 54 on the inner end of each member 52, 53 and between the receptacle body 10 and the seal 54 on the outer end of each seat member.

The bonnet 48 is secured to the receptacle body 10 by the clamping ring 65. As will be seen the arrangement is relatively simple to assemble and operate and is also relatively simple to manufacture. The assembly can be carried out by a remotely operated vehicle or by a diver.

The arrangement shown in the drawings has a gate body 30 which is connected to a bonnet assembly 40 by means of the bolts 44. It will be appreciated that it is possible to manufacture an arrangement in which the body 30 and the bonnet assembly 48 are integral.

It will be appreciated that retrieval of the insert assembly is substantially the reverse of assembly procedure described above. The ring 65 is released and the gate is actuated to assume its minimum lateral dimension condition. The insert assembly can then be removed from the receptacle.

The invention has been described with reference to an expandable type gate which is the preferred arrangement. The insert assembly can also operate satisfactorily with a slab-type gate which is not expandable. When an insert containing a slab-type gate is located in its receptacle the upstream pressure on the gate will cause the gate to move laterally to such an extent that sealing will occur between the gate and seat and between the seat and receptacle body.

What is claimed is:

1. A valve arrangement, comprising:
   an insert assembly removably receivable in a receptacle,
   the insert assembly including valve elements for controlling fluid flow through a flow path in the insert assembly,
   the receptacle including a flow path which, when the insert assembly is received in the receptacle, communicates with the flow path in the insert assembly,
   the insert assembly further including an insert body, a gate and annular seat members disposed in the flow path therethrough, wherein the insert assembly is received in a generally cylindrical cavity in the receptacle, said cavity having diametrically opposite recesses of generally rectangular cross-section which define flat surfaces against which the seat members seal and said recesses including upwardly and outwardly extending upper portions to urge said annular seat members into metal-to-metal sealing engagement with the gate and into metal-to-metal sealing engagement with the flat surfaces of the receptacle body.

2. A valve arrangement according to claim 1, wherein the insert assembly includes a member defining a gate guide which is carried by a bonnet assembly.

3. A valve arrangement according to claim 2, wherein said insert body is connected to the bonnet assembly by securing means.

4. A valve arrangement according to claim 3, wherein the insert body and bonnet assembly are formed integrally.

5. A valve arrangement according to claim 4, wherein opposite end faces of the annular seat members carry metal-to-metal seal means for sealing against the gate and receptacle body.

6. A valve arrangement according to claim 5, wherein said metal-to-metal seal means includes a ring of rectangular cross section.

* * * * *